(12) United States Patent
Schuckmann et al.

(10) Patent No.: US 8,463,020 B1
(45) Date of Patent: Jun. 11, 2013

(54) CENTRALIZED IMMERSIVE IMAGE RENDERING FOR THIN CLIENT

(75) Inventors: Matthew Z. Schuckmann, Portland, OR (US); Patrick W. White, Aloha, OR (US)

(73) Assignee: iMove, Inc., Portland, OR (US)

( * ) Notice: Subject to any disclaimer, the term of this patent is extended or adjusted under 35 U.S.C. 154(b) by 1008 days.

(21) Appl. No.: 12/498,933

(22) Filed: Jul. 7, 2009

Related U.S. Application Data

(60) Provisional application No. 61/079,098, filed on Jul. 8, 2008.

(51) Int. Cl.
*G06K 9/00* (2006.01)
*H04N 7/00* (2011.01)

(52) U.S. Cl.
USPC ............................................ 382/154; 348/36

(58) Field of Classification Search
None
See application file for complete search history.

(56) References Cited

U.S. PATENT DOCUMENTS

| | | | | |
|---|---|---|---|---|
| 7,866,832 B2* | 1/2011 | Jaynes et al. | | 353/121 |
| 8,009,178 B2* | 8/2011 | Chen et al. | | 345/629 |
| 2006/0132482 A1* | 6/2006 | Oh | | 345/419 |
| 2007/0035707 A1* | 2/2007 | Margulis | | 353/122 |
| 2007/0188719 A1* | 8/2007 | Jaynes et al. | | 353/94 |
| 2007/0291185 A1* | 12/2007 | Gelb et al. | | 348/745 |
| 2008/0291201 A1* | 11/2008 | Lafon | | 345/427 |
| 2009/0002394 A1* | 1/2009 | Chen et al. | | 345/632 |

\* cited by examiner

*Primary Examiner* — Bhavesh Mehta
*Assistant Examiner* — Tahmina Ansari
(74) *Attorney, Agent, or Firm* — Fenwick & West LLP

(57) ABSTRACT

A method and/or system for performing computationally intensive processing associated with rendering and displaying an immersive image in an immersive view server and performing minimal or no additional processing at a viewer device. The viewer devices send viewing parameters to the immersive view server. In response, the immersive view server generates and sends images that may be part of the immersive image for display in viewports of the viewer devices. The viewer devices receive and display the image received from the server without or with minimal additional processing of the received images. The immersive view server and the viewer devices need only communicate view parameters and images corresponding to the viewport. Resource intensive processing is performed at the immersive view server. Hence, minimal computational and memory resources are required at the viewer device to display the immersive image.

22 Claims, 4 Drawing Sheets

CENTRALIZED IMMERSIVE IMAGE RENDERING FOR THIN CLIENT

RELATED APPLICATION

This application claims priority under 35 U.S.C. §119(e) to U.S. Patent Application Ser. No. 61/079,098 entitled "Thin Client Based Immersive Video Servicing," filed on Jul. 8, 2008, which is incorporated by reference herein in its entirety.

BACKGROUND

1. Field of Art

The present invention generally relates to rendering and displaying immersive images, more specifically to rendering immersive views at a centralized server and transmitting the immersive images to one or more viewer devices over a network for display.

2. Background of the Invention

An immersive image or immersive video is also referred to as panoramic images or panoramic video. The immersive image or video is generated by seaming two or more single view images or video frames captured by two or more cameras positioned to cover different fields of view. The cameras are often equipped with wide field of view (FOV) fisheye distortion lenses. The single view images or video frames are de-warped and seamed into a single immersive image or video frame. At least a part of the projection image or video frame is rendered and displayed for viewing.

The process of seaming and de-warping the image requires a large amount of computational and memory resources. Although many computing devices are coming equipped with sufficient processing power and memory to perform immersive imaging process, their resources may be restricted for one or more reasons. Hence, the process of rendering an immersive image or video frame on such computing devices may take a large amount of time. Further, a large memory space may be needed in the computing devices to store high resolution single view images.

In some immersive imaging systems, a user may choose to view a selected portion of the immersive image or video frame in a viewport. The viewport is an area on a screen that displays a portion of the immersive image or video frame. The user may operate a computing device to view the immersive image or video frame from different pan angle, tilt angle, and zoom level in the viewport. Based on user input, an immersive imaging system may render a viewport image to display different parts or aspects of the immersive image in its viewport. The process of generating viewport images may also require a large amount of computational and memory resources, especially for cases involving immersive images of large size.

In certain applications, an immersive imaging system may generate immersive images or frames from single view images received over a network. If the bandwidth of the network is constrained, the process of displaying immersive views or frames may be delayed due to the time spent on receiving the single view images over the network.

SUMMARY

Embodiments provide a method and/or system for processing an immersive image at a computing device (e.g., a server), and then sending at least a portion of the immersive image to one or more viewer devices for display. The computing device generates the immersive image by seaming a plurality of single view images captured by image capturing devices with different fields of view or different resolutions. The computing device receives respective viewing parameters from the viewer devices defining the configurations of images to be displayed in each viewer device. In response, the computing device generates images including at least a portion of the immersive image based on the viewing parameters. The computing device then sends the generated images to the viewer devices for display.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments provide a method and/or system for performing computationally intensive processing associated with rendering an immersive image at an immersive view server and performing minimal or no additional processing at a viewer device that displays at least a part of the immersive image. The viewer devices send viewing parameters to the immersive view server. In response, the immersive view server generates and sends images that may be part of the immersive image for displaying in viewports of the viewer devices. The viewer devices receive and display the images received from the server without or with minimal additional processing of the received images. Resource intensive processing is performed at the immersive view server. Hence, minimal computational and memory resources are required at the viewer device to display the immersive image. Further, the immersive view server and the viewer devices need only communicate view parameters and images corresponding to the viewport. Therefore, delay due to communicating a large amount of data over a network may be mitigated.

An immersive image described herein refers to a panoramic image consisting of multiple single view images seamed together. The single view images in the immersive image may partially overlap and/or have different resolutions. The immersive image includes video frames or fields in an immersive video.

Viewing parameters described herein refer to parameters for defining characteristics of at least a portion of the immersive image for displaying at a viewer device. The viewing parameters may indicate, among others, pan, zoom level, azimuth, elevation, field of view, and the size of view.

Architecture of Immersive Imaging System

Figure 1:
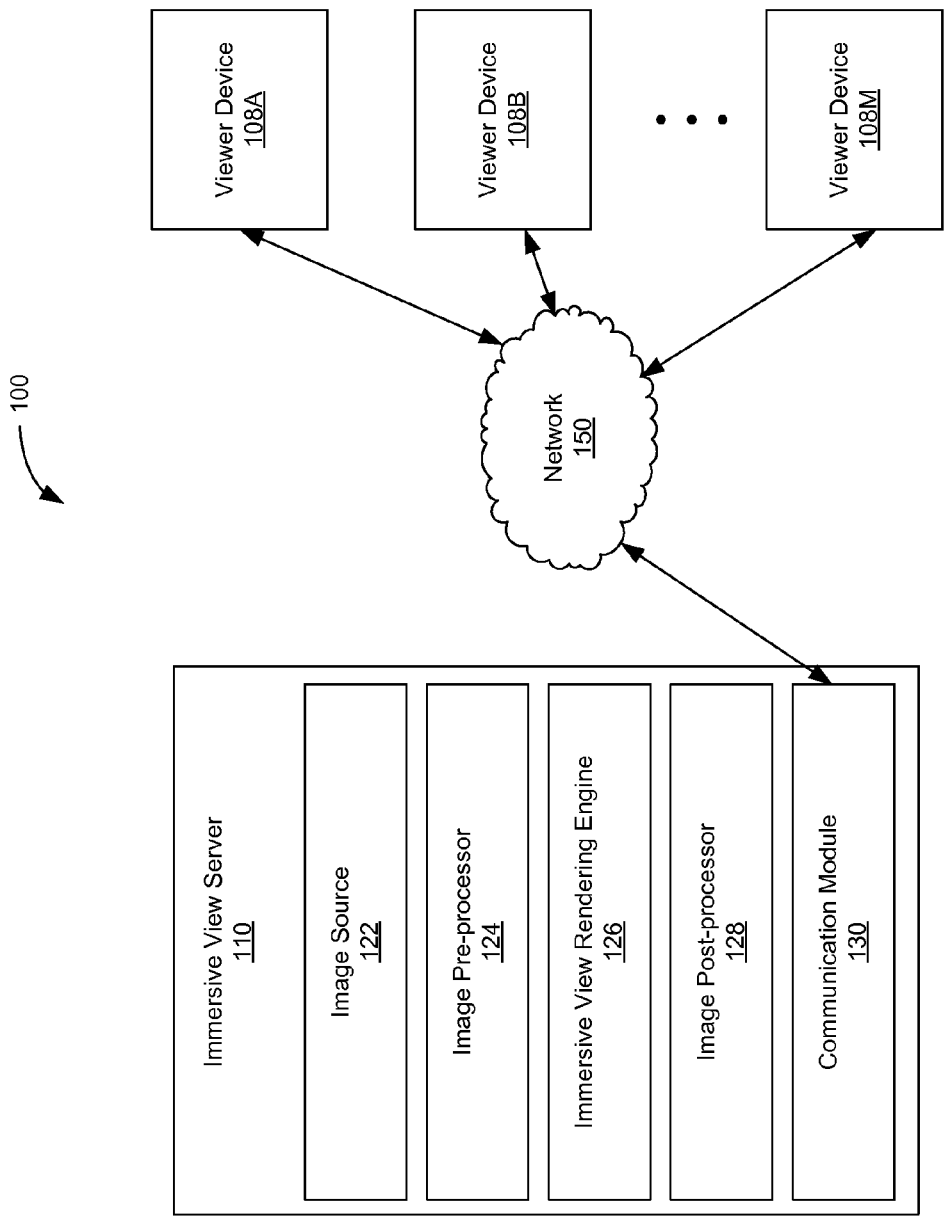
FIG. 1 is a diagram illustrating an immersive imaging system, according to one embodiment.

FIG. 1 is a diagram illustrating an immersive imaging system 100, according to one embodiment. The immersive imaging system 100 may include, among other components, an immersive view server 110, a network 150 and viewer devices 108A through 108M (hereinafter collectively referred to as "the viewer devices 108"). The immersive view server 110 and the viewer devices 108 are operatively coupled to the network 150 to communicate viewing parameters and data of immersive images. The immersive imaging system 100 may also include various other components that are not illustrated in FIG. 1. Alternatively, the immersive imaging system 100 may have module different from the components illustrated in FIG. 1.

The immersive view server 110 is a computing device having computing and storage capacity to process and send at least part of immersive images. The immersive view server 110 may include, among others, components for (i) receiving the viewing parameters from the viewer devices 108, (ii) seaming multiple single view images into immersive images, (iii) extracting or projecting part of the immersive image based on the viewing parameters, and (iv) sending the immersive images to the viewer devices 108, as described below in detail.

The network 150 may be any communications network that is capable of conveying data between the immersive view server 110 and the viewer devices 108. In one embodiment, the network 150 uses standard communications technologies and/or protocols and comprises the Internet. The network 114 may also include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The viewer devices 110 are any computing devices capable of (i) sending viewing parameters over the network 150, (ii) receiving images over the network 150, and (iii) displaying the images received via the network 150. The viewer devices 110 may include, among other devices, desktop computers, laptop computers, cell phones, smartphones, personal digital assistants (PDAs), game consoles, portable media players, and set-top boxes. The viewer device 110 may be coupled to or include a display device such as an LCD (Liquid Crystal Display) screen.

Structure of Immersive View Server

As illustrated in FIG. 1, the immersive view server 110 may include, among other components, an image source 122, an image pre-processor 124, an immersive view rendering engine 126, an image post-processor 128 and a communication module 130. The image source 122 is coupled to the image pre-processor 124. The immersive view rendering engine 126 is coupled to the image pre-processor 124. The image post-processor 128 is coupled to the immersive view rendering engine 126. The communication module 130 is coupled to the immersive view rendering engine 126 and the image post-processor 128. One or more of these components may be embodied as firmware, hardware, software or combinations thereof. Moreover, the immersive view server 110 may also include other components that are not illustrated in FIG. 1 for the sake of brevity.

The image source 122 is hardware, software, firmware or a combination thereof for storing single view images. In one embodiment, the image source 122 is coupled to multiple cameras to receive the images covering different fields of view. The stored single view images may be time stamped by a global clock to indicate the time when the images were captured by cameras. The time stamps allow the image pre-processor 124 to synchronize the single view images captured by different cameras. The image source 122 may be implemented as a buffer for temporarily storing single view images captured by the multiple cameras. The single view images from a live feed may be stored in the buffer and processed to produce panoramic images in real-time. In one embodiment, the images stored in the image source 122 have different resolutions and/or frame rates.

The image pre-processor 124 is hardware, software, firmware or a combination thereof for performing various pre-processing of images stored in the image source 122. The pre-processing performed at the pre-processor 124 may include, but is not limited to, decompression of images, decoding of the single view images, de-warping of the single view images, and image video enhancement. The image pre-processor 124 may also synchronize images based on the time stamps. The synchronization may be performed to generate video stream of immersive images. In one embodiment, the immersive view server 110 does not include the image pre-processor 124. That is, the image source 122 is directly coupled to the immersive view rendering engine 126 to receive the images from the image source 122 without any pre-processing.

The immersive view rendering engine 126 is hardware, software, firmware or a combination thereof for generating immersive images based on the pre-processed single view images. In one embodiment, the immersive view rendering engine 126 generates viewport images by seaming single view images into immersive images and projecting the immersive images according to the viewing parameters received from the viewer devices 108, as described below in detail with reference to FIG. 2. A viewport described herein refers to a two-dimensional area of an immersive image displayed on the viewer device. A viewport covers a region less than the entire immersive image, and the size of the area covered changes according to a zoom level. A viewport image described herein refers to a two-dimensional image that is displayed in the viewport of the viewer device 108.

The image post-processor 128 is hardware, software, firmware or a combination thereof for receiving the images corresponding to the viewports of the viewer devices, and processing the images for transmission to the viewer devices 108. The post-processing performed at the image post-processor 128 may include, among others, compression and image enhancement. In one embodiment, the image post-processor 128 is omitted, and the viewport images generated by the immersive view rendering engine 126 are fed directly to the communication module 130.

The communication module 130 is hardware, software, firmware or a combination thereof for receiving the viewing parameters from the viewer devices 108 and sending viewport images to the viewer devices 108. In one embodiment, the communication module 130 employs, among others, TCP/IP protocol to communicate with the viewer devices 108 via the network 150. The communication module 130 may implement multiple sockets, each socket assigned to different applications running on the immersive view server 110. Alternatively, each socket may be assigned to communicate with different viewer devices 108.

Structure of Image View Rendering Engine

Figure 2:
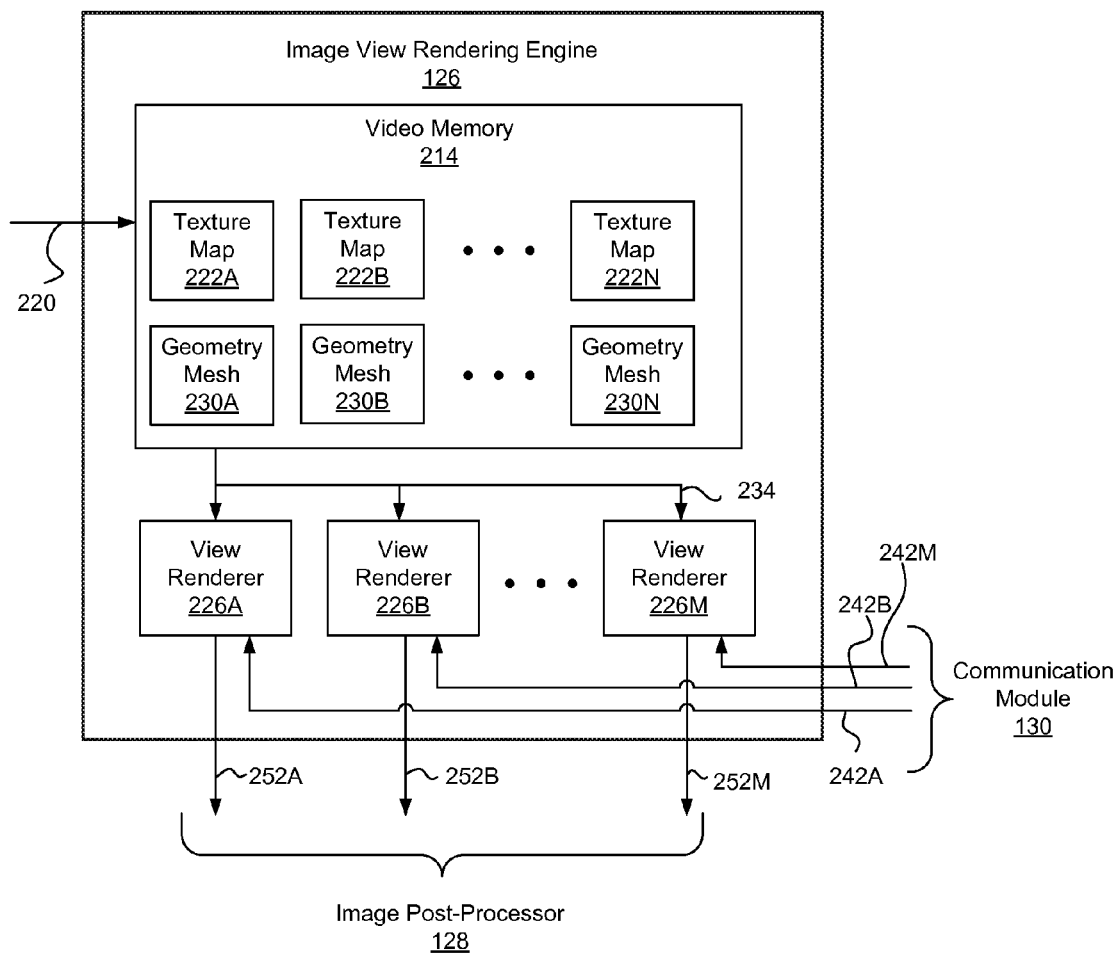
FIG. 2 is a functional block diagram illustrating an image view rendering engine in an immersive view server, according to one embodiment.

FIG. 2 is a functional block diagram illustrating the image view rendering engine 126, according to one embodiment. The image view rendering engine 126 may include, among other components, video memory 214 and view renderers 226A through 226M (hereinafter collectively referred to as "the view renderers 226"). The video memory 214 is coupled to the image pre-processor 124 to receive single view images 220. Each of the video renderers 226 is coupled to the video memory 214 to receive video data stored in the video memory 214. Each video renderer 226A through 226M is also coupled to the communication module 130 to receive respective viewing parameters 242A through 242M (hereinafter collectively referred to as "the viewing parameters 242").

The video memory 214 stores data for single view images. The video memory 214 may also store other data needed for de-warping or seaming the single view images 220 into an immersive image.

In one embodiment, the image view rendering engine 126 employs texture mapping technique to seam single view images 220 into an immersive image. For this purpose, the video memory 214 stores, among other data, texture maps 222A through 222N (hereinafter collectively referred to as "the texture maps 222") and geometry meshes 230A through 230N (hereinafter collectively referred to as "the geometry meshes 230"). Each of the texture maps 222A through 222N is associated with one of the geometry meshes 230A through 230N. Each of the geometry meshes 230A through 230N stores a three dimensional mesh of points describing an area in the interior of a sphere or other geometric configurations that corresponds to a field of view covered by a camera. The spatial relationships between cameras are known beforehand, and therefore, the meshes of points for multiple cameras can be loaded into geometry meshes 230A through 230N at the startup of the immersive view server 110. A single view image captured from a camera is uploaded to one of the texture maps 222A through 222N.

The view renderers 226 read data stored in the texture maps 222 and the geometry meshes 230 to generate viewport images 252A through 252M (hereinafter collectively referred to as "the viewport images 252"). Each of the view renderers 226 is coupled to the communication module 130 to receive each set of viewing parameters 242A through 242M (hereinafter collectively referred to as "the viewing parameters 242") from one of the viewer devices 108A through 108. Specifically, each of the view renderers 226 serves a single viewer device by (i) receiving a set of viewing parameters from the viewer device, (ii) generating a viewport image by seaming single view images into an immersive image, (iii) projecting or extracting parts of the immersive image to produce the viewport image 252 according to the set of viewing parameters, and (iv) sending the viewport image 252 to the viewer device 108.

Each viewer renderer 226 may include a distinct hardware component and/or a software component. Alternatively, the viewer renderer 226 may be the same hardware component allocated to serve different viewer devices at different times.

In one embodiment, the view renderers 226 upsample or downsample the data in the texture map to seam single view images of different resolutions. The single view images captured by the cameras may have different resolution. Whether to downsample a higher resolution single view image or upsample a lower resolution single view image may be determined based on the viewing parameters 242. That is, if the viewport image 252 as defined by the viewing parameters 242 is zoomed to a level where high resolution image pixels are needed, the lower resolution single view images are upsampled and seamed with the high resolution single view images. If the viewport image 252 is at a low zoom level where the high resolution image pixels are not displayed, then the higher resolution single view images are downsampled and seamed with the lower resolution single view images. The original single view images are retained and reused to generate each independent viewport image 252 from the associated viewing parameters 242. By upsampling or downsampling the single view images, the most detailed view possible given the single view images and the viewing parameters may be obtained.

In an alternative embodiment, all low resolution single view images are upsampled to a high resolution and then seamed to generate a single high resolution immersive image. The single high resolution image is then stored in the view renderers 226 to generate viewport images 252 according to the viewing parameters 242 for each viewer device 108 with repeating the process of upsampling and seaming the single view images. In still another embodiment, all high resolution single view images are downsampled and seamed to generate a single low resolution immersive image. The single low resolution immersive image may be stored in the view renderer 226.

In one embodiment, one of the video renders 226 generates an immersive image by seaming most or all of the relevant single view images 220. Such immersive image is then stored in the image view rendering engine 126 for use by the video renderers 226. In this way, duplicative seaming of the same single view images may be eliminated. The other view renderers 226 can perform a simpler projection from the already generated immersive image to obtain the viewport image 252 for the assigned viewer device 108. Alternatively, each of the viewer renderers 226 may individually select the single view images to be included in the viewport image based on the viewing parameters, seam the selected single view images into the immersive image, and then project the seamed immersive image to obtain the viewport image 252 relevant to the assigned viewer device 108.

In one embodiment, the image view rendering engine 126 is implemented as a graphics card. The graphics card is well adapted to perform the rendering operation for generating immersive images. In many cases, a graphics card can load single view images and produce viewport images at a very fast speed by using highly parallel hardware configuration. The graphics card may perform a real-time rendering of the view port images 252 upon receiving the viewing parameters 242. The viewport images 252 generated by the graphics card are stored in memory called a back-buffer. The back-buffer is generally used to store processed image data for quick and efficient display on a screen. In embodiments using a graphics card, the data of the viewport images 252 may be stored in the back-buffer and then sent to the viewer devices 108. To support multiple viewer devices 108, multiple back-buffers may be setup on the graphics card for storing the viewport images 252 for multiple viewer devices 108.

In one embodiment, the operations of the image view rendering engine 126 are managed by a software application. The software application support various operations, including among others, setting up of the geometry meshes 230 based on spatial relationships between cameras, configuring of operational parameters (e.g., frame rates or maximum viewport image resolution), and creating of a back-buffer upon instantiation of a view renderer 226. The software application may, for example, be a GeoNetServer, commercially available from iMove, Inc., of Portland, Oreg.

Structure of Viewer Device

Minimal resources are required at the viewer device 108 to view the immersive image because resource-intensive operations associated with rendering the viewport images 252 are performed by the immersive view server 110. The viewer device 108 need only have capability to send viewing parameters to the immersive view server 110 via the network 150, and display two dimensional viewport images received from the immersive view server 110.

Figure 3:
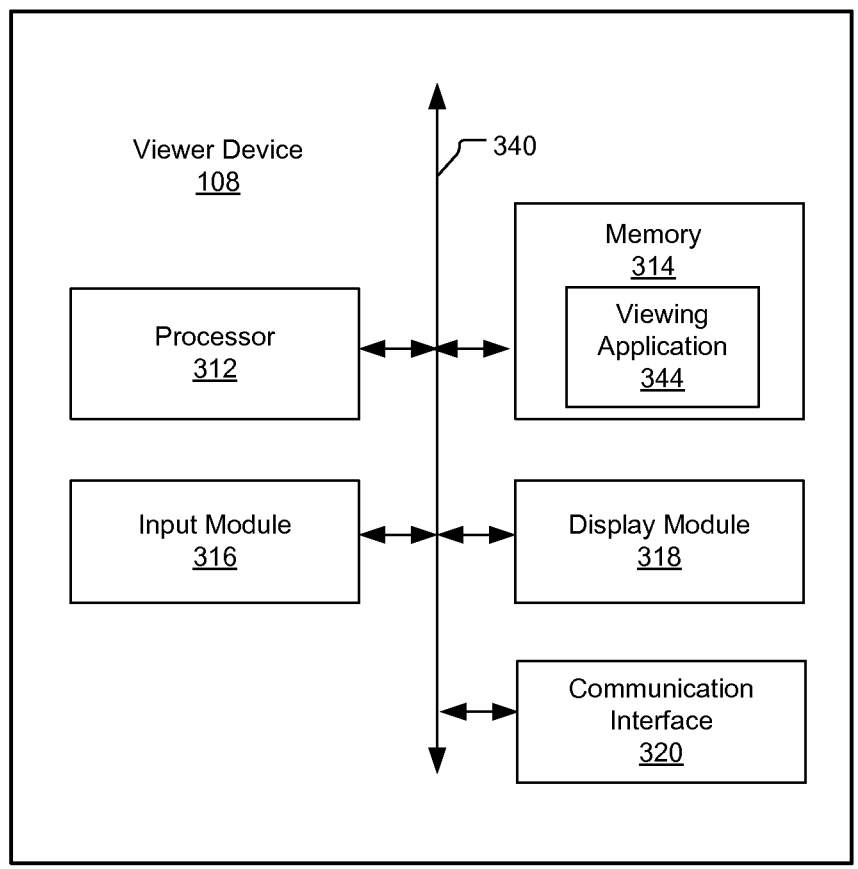
FIG. 3 is a functional block diagram illustrating a viewer device, according to one embodiment.

FIG. 3 is a functional block diagram illustrating a viewer device 108, according to one embodiment. The viewer device 108 may include, among other components, a processor 312, memory 314, an input module 316, a display module 318 and a communication interface 320. These components are operatively coupled via a bus 340 to communicate data between each other. The viewer device 108 may also include other components not illustrated in FIG. 3.

The processor 312 is any processing unit performing operations according to instructions stored in the memory 314. The viewer device 108 may include multiple processors to perform different functions or to increase the overall processing capability of the viewer device 108.

The memory 314 stores instructions and data associated with performing operations on the viewer device 108. The memory 314 may store, among other software components, a viewing application 344.

The viewing application 344 receives user input via the input module 316 to generate viewing parameters for a viewport image to be displayed on the display module 318. The viewing application 344 sends the viewing parameters to the immersive view server 110 via the communication interface 320. The viewing application 344 also receives the viewport image from the immersive view server 110 via the communication interface 320, decodes the received viewport image, and displays the decoded viewport image on the display module 318. In one embodiment, the viewing application 344 is an applet or API (Application Program Interface) that functions in conjunction with other programs such as a web browser installed on the viewer device 108.

In one embodiment, the user input is processed instantaneously by the viewing application 344 to generate and send the viewing parameters to the immersive view server 110. The viewport images in response to the viewing parameters may be received, decoded and displayed on the display module 318 in real-time.

The input module 316 may be any user interface devices capable of receiving user input. The input module 316 may be implemented, for example, as a mouse, a keyboard, a touchscreen or any combination thereof.

The display module 318 is hardware or a combination of hardware and software for displaying viewport images generated by the viewing application 344. The display module 318 may be implemented, for example, as a LCD (Liquid Crystal Display) screen.

The communication interface 320 sends the viewing parameters to the immersive view server 110 and receives the viewport images from the immersive view server 110 over the network 150.

Method of Displaying Immersive Image

Figure 4:
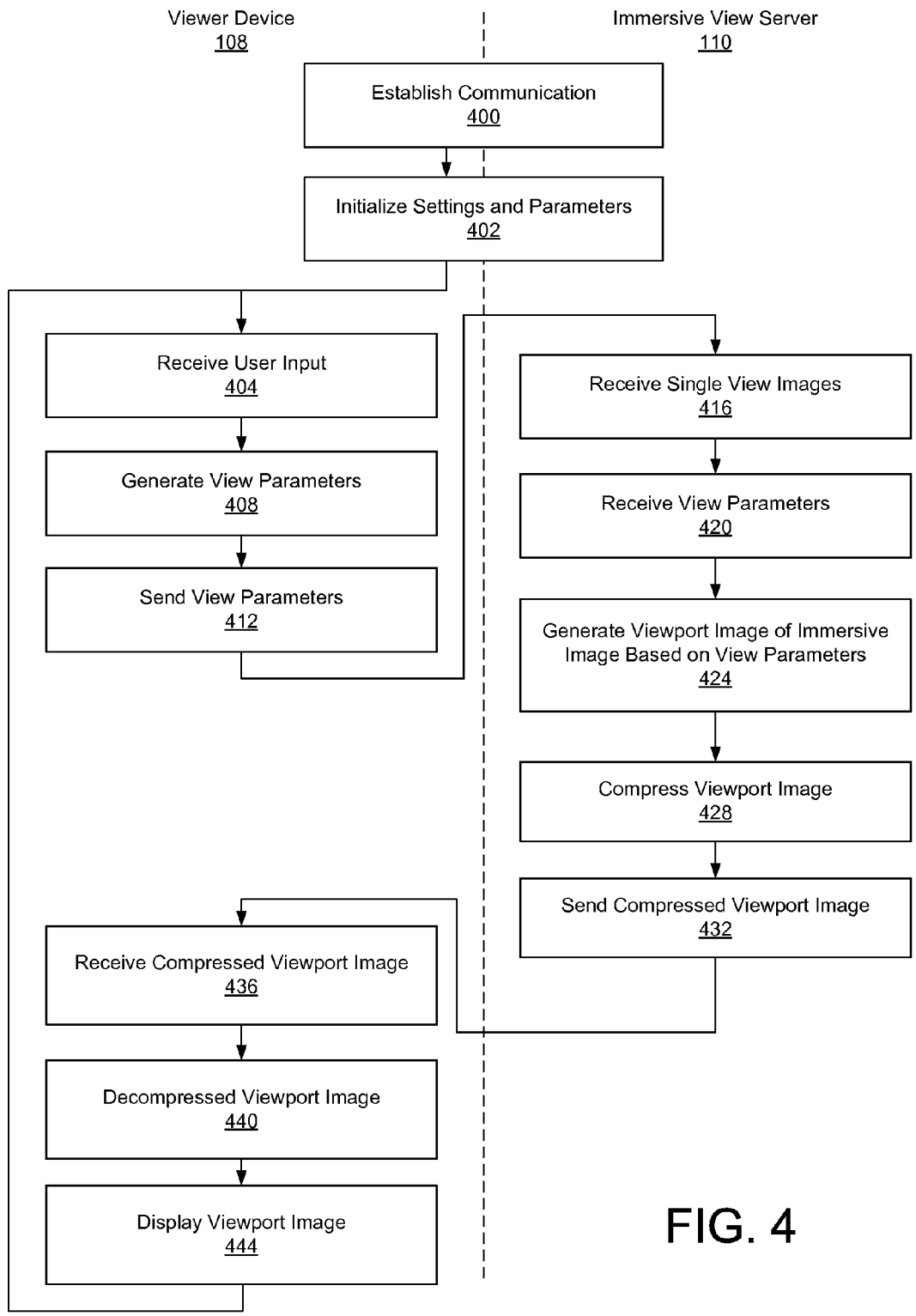
FIG. 4 is a flowchart illustrating the process of providing at least a portion of an immersive image to a thin viewer device, according to one embodiment.

FIG. 4 is a flowchart illustrating the process of serving immersive images to the viewer device 108, according to one embodiment. The viewer device 108 and the immersive view server 110 establish 400 a communication channel. The communication channel may be established using various types of technology including, for example, TCP/IP protocol. The viewer device 108 and the immersive view server 110 initialize 402 settings and parameters. During the initialization 402, the immersive view server 110 may (i) load single view images and video frames into the image source 122, (ii) load geometry meshes 230 into the image view rendering engine 126, and (iii) set encryption or compression format or parameters at the image post-processor 128. During the initialization 402, the viewer device 108 may launch the viewing application 344 or other associated programs, and select the immersive image for displaying.

The viewer device 108 receives 404 user input via the input module 316. The viewer device 108 generates 408 the viewing parameters based on the user input. The viewer device 108 then sends 412 the viewing parameters to the immersive view server 110 via the network 150.

The immersive view server 110 receives 416 the single view images from sources (e.g., multiple cameras), converts the images into a texture maps, and stores the texture maps in the image view rendering engine 126. The immersive view server 110 also receives 420 the viewing parameters 420 from the viewer device 108. The immersive view server 110 then generates 424 a viewport image based on the viewing parameters, as described above in detail with reference to FIG. 2. The generation of viewport image requires a large amount of computation and memory resources. Because this process of generating the viewport image is performed in the immersive view server 110 and not in the viewer device 108, a minimal amount of resources are required at the viewer device 108 to display the viewport image. The immersive view server 110 then compresses 428 the viewport image, and sends 432 the compressed viewport image to the viewer device 108 over the network 150. The viewport image may be sent to the viewer device without compression to minimize processing at the viewer device 108.

The viewer device 108 receives the compressed viewport image 436 and decompresses 440 the viewport image. If the viewport image is not compressed, the process of decompressing 440 may be omitted. The viewer device 108 then displays 444 the viewport image on its display module 318. Then the process returns to receive 404 user input for updated viewing parameters, and repeats the subsequent processes.

The components of the viewer device 108 and/or the immersive viewer server 110 may be implemented as software that may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method, comprising:
   at a computing device, receiving a plurality of single view images captured by image capturing devices with different fields of view or resolutions;
   at the computing device, receiving a plurality of viewing parameters from a corresponding plurality of viewer devices, each of the plurality of viewer devices located remotely from the computing device, each of the viewing parameters defining configurations of a viewport image to be displayed in a viewport of the corresponding viewer device of the plurality of viewer device;

at the computing device, generating a plurality of viewport images based on the plurality of viewing parameters, each of the plurality of viewport images configured for display in the viewport of the corresponding viewer device and representing a portion of an immersive image generated by seaming at least two of the plurality of the single view images; and at the computing device, sending each of the plurality of viewport images to the corresponding viewer device for display in the viewport of the corresponding viewer device.

2. The method of claim 1, wherein each of the plurality of viewport images is generated by projecting the generated immersive image.

3. The method of claim 1, further comprising upsampling or downsampling at least one of the plurality of the single view images for seaming with another of the plurality of the single view images based on the plurality of viewing parameters.

4. The method of claim 1, wherein generating the plurality of viewport images comprises texture mapping of the single view images.

5. The method of claim 4, further comprising:
storing geometry meshes corresponding to fields of view of the image capturing devices, and
generating the immersive image by seaming the single view images based on the texture mapping and the geometry meshes.

6. The method of claim 1, wherein each of the viewing parameters comprises at least one of viewing angles, elevation, field of view and the size of the first image.

7. The method of claim 1, wherein each of the viewing parameters is generated at the corresponding viewer device responsive to receiving user input at the corresponding viewer device.

8. The method of claim 1, further comprising compressing each of the plurality of viewport images for sending to the corresponding viewer device.

9. The method of claim 1, further comprising preserving the resolution of at least one of the plurality of the single view images after generating the plurality of viewport images.

10. The method of claim 1, further comprising buffering the plurality of single view images received from the image capturing devices.

11. A computing device for providing an immersive image, comprising:
an image source configured to store a plurality of single view images captured by image capturing devices with different fields of view or resolutions;
a communication module configured to receive a plurality of viewing parameters from a corresponding plurality of viewer devices, each of the plurality of viewer devices located remotely from the computing device, each of the viewing parameters defining configurations of a viewport image to be displayed in a viewport of the corresponding viewer device of the plurality of viewer devices, the communication module further configured to send each of the plurality of viewport images to the corresponding viewer device for display in the viewport of the corresponding viewer device; and
an immersive view rendering engine configured to generate a plurality of viewport images based on the plurality of viewing parameters, each of the plurality of viewport images configured for display in the viewport of the corresponding viewer device and representing a portion of the immersive image generated by seaming at least two of the plurality of the single view images.

12. The computing device of claim 11, wherein the immersive view rendering engine is further configured to generate each of the plurality of viewport images by projecting the immersive image.

13. The computer device of claim 11, wherein the immersive view rendering engine is further configured to upsample or downsample at least one of the plurality of the single view images for seaming with another of the plurality of the single view images based on the plurality of viewing parameters.

14. The computing device of claim 11, wherein the image view rendering engine is further configured to perform texture mapping on at least one of the single view images.

15. The computing device of claim 14, wherein the image view rendering engine is further configured to:
store geometry meshes corresponding to fields of view of the image capturing devices, and
generate the immersive images by seaming the single view images based on the texture mapping and the geometry meshes.

16. The computing device of claim 11, wherein each of the viewing parameters comprises at least one of viewing angles, elevation, field of view and the size of the first image.

17. The computing device of claim 11, wherein each of the viewing parameters is generated at the corresponding viewer device responsive to receiving user input at the corresponding viewer device.

18. The computing device of claim 11, wherein the image source is further configured to preserve the resolution of at least one of the plurality of the single view images after generating the plurality of viewport images.

19. The computing device of claim 11, wherein the image source comprises a buffer for temporarily storing the plurality of single view images received from the image capturing devices.

20. A non-transitory computer readable storage medium storing instructions thereon, when executed by a processor in a computing device, causes the processor to: receive a plurality of single view images captured by image capturing devices with different fields of view or resolutions; receive a plurality of viewing parameters from a corresponding plurality of viewer devices, each of the plurality of viewer devices located remotely from the computing device, the first each of the viewing parameters defining configurations of a viewport image to be displayed in a viewport of the corresponding viewer device of the plurality of viewer device; generate a plurality of viewport images based on the plurality of viewing parameters, each of the plurality of viewport images configured for display in the viewport of the corresponding viewer device and representing a portion of an immersive image generated by seaming at least two of the plurality of the single view images; and send each of the plurality of viewport images to the corresponding viewer device for display in the viewport of the corresponding viewer device.

21. The method of claim 1, wherein each of the plurality of view ports is displayed on the viewport of the corresponding viewer device without additional image processing at the viewer device.

22. The method of claim 1, wherein the plurality of viewport images are generated at a graphics card in the computing device.

* * * * *